United States Patent [19]
Gerard et al.

[11] Patent Number: 5,645,658
[45] Date of Patent: Jul. 8, 1997

[54] TIRE WITH TWO TREADS HAVING BETWEEN TREADS A REINFORCEMENT RING WHOSE LOAD-ELONGATION CURVE IS NON-LINEAR

[75] Inventors: François Gerard, Riom; Patrice Peyraud, Chalmieres, both of France

[73] Assignee: Compagnie Generale des Etablissements Michelin - Michelin & Cie, Clermont-Ferrand Cedex, France

[21] Appl. No.: 481,370

[22] PCT Filed: Feb. 21, 1994

[86] PCT No.: PCT/EP94/00498

§ 371 Date: Aug. 18, 1995

§ 102(e) Date: Aug. 18, 1995

[87] PCT Pub. No.: WO94/20316

PCT Pub. Date: Sep. 15, 1994

[30] Foreign Application Priority Data

Mar. 1, 1993 [FR] France .................. 93 02537

[51] Int. Cl.$^6$ .................. B60C 3/00; B60C 11/00
[52] U.S. Cl. .................. 152/209 WT; 152/451; 152/454; 152/528; 152/531
[58] Field of Search .................. 152/209 WT, 451, 152/209 R, 533, 454, 531, 196–198, 200, 205, 207, 526, 527, 538, 540, 545, 528

[56] References Cited

U.S. PATENT DOCUMENTS

| 2,990,869 | 7/1961 | Riley . | |
|---|---|---|---|
| 3,830,273 | 8/1974 | Boileau | 152/209 WT |
| 4,945,967 | 8/1990 | Tavazza et al. | 152/531 |
| 5,277,236 | 1/1994 | Takatsu et al. | 152/531 X |
| 5,407,701 | 4/1995 | Reuter | 152/531 X |
| 5,419,383 | 5/1995 | Iwamura | 152/531 X |

FOREIGN PATENT DOCUMENTS

| A0465786 | 1/1992 | European Pat. Off. . |
| A1061924 | 4/1954 | France . |
| WO9014239 | 11/1990 | WIPO . |

*Primary Examiner*—Adrienne C. Johnstone
*Attorney, Agent, or Firm*—Brumbaugh, Graves, Donohue & Raymond

[57] ABSTRACT

In a tire comprising two identical treads (1A) and (1B) reinforced by two crown reinforcements (2A) and (2B) and separated by a connecting zone (6) formed of a groove (8) and a ring (7), the ring (7) has a curve representing the circumferential tensile load F as a function of the relative elongation $\epsilon$ which is non-linear, the ring (7) having for small relative elongations a circumferential tensile rigidity less than for larger relative elongations.

5 Claims, 3 Drawing Sheets

TIRE WITH TWO TREADS HAVING BETWEEN TREADS A REINFORCEMENT RING WHOSE LOAD-ELONGATION CURVE IS NON-LINEAR

BACKGROUND OF THE INVENTION

The present invention relates to a tire having two separate treads, spaced axially apart by a connecting zone which is formed of a central groove and a reinforcement ring arranged radially below said groove, the carcass reinforcement of said tire extending from one bead to the other, passing below said ring.

The tire in question, generally of a aspect ratio H/B of at most 0.60, rests on the ground with a contact surface which is as large as possible. This tire, as described in French application 2 187 560, thus has good adherence on dry ground and, due to the presence of the connecting zone between the two treads, very good adherence on wet ground.

Such a tire, which is intended primarily for high-speed vehicles, has however a number of drawbacks due to the speed and in particular irregular transverse and/or circumferential wear.

SUMMARY OF THE INVENTION

In order to overcome said drawbacks, the present invention proposes a tire having two treads which are spaced axially from each other by a connecting zone comprising a groove and, in its middle, a reinforcing ring of a radius less than that of the treads, characterized by the fact that the reinforcement ring has a curve of the circumferential tension load as a function of the relative elongation which is non-linear, monotonic and increasing, and has at each of its points a tangent the slope of which is positive it being formed of three segments OA, AB and BR, a first segment OA for which the circumferential tensile rigidity is substantially constant permitting easy elongation of the ring, a second segment BR for which the of circumferential tensile rigidity is substantially constant and greater than the rigidity of the first segment OA, the two segments OA and BR being connected by a strongly curved segment AB, said curve C being included within a region of the plane bounded by two curves C1 and C2, each of which curves is formed of successive linear segments:

the first curve C1 comprising a first segment extending from the point of origin O to a point A1 of a relative elongation equal to 0.01 and having a slope of $12 \times 10^4$ daN, followed by a second segment extending beyond the point A1 and having a slope of $28 \times 10^4$ daN;

the second curve C2 comprising a first segment extending from the point of origin O to a point A2 of a relative elongation equal to 0.01 and having a slope of $2 \times 10^4$ daN, a second segment extending from the point A2 to a point B2 of a relative elongation equal to 0.025 and having a slope of $4 \times 10^4$ daN, this second segment being followed by a third segment extending beyond the point B2 and having a a slope of $6 \times 10^4$ daN.

Thus, under the effect of the centrifugal force due to the speed, the reinforcement ring of the connecting zone can easily stretch up to a given relative elongation and thus permit the two interior edges of the two treads to increase their radii, this variation in the interior radii being then similar to the variation of the radii of the axially exterior edges of the treads.

The tire in question can thus retain a tread profile the transverse curvatures of which are substantially constant as a function of the speed of travel, which permits more uniform wear of the tread and accordingly a longer wear life.

By elongation of a ring with an interior diameter $\phi$ there is understood the difference in circumferential lengths of the ring placed under circumferential tensile load. If $\phi'$ is the interior diameter of the ring under tensile load, the elongation is $\pi(\phi' - \phi)$ and the relative elongation is $(\phi' - \phi)/\phi$.

The slope of the tangent to a curve is the ratio of the increase in the tensile load (force) to the unit increase of relative elongation. If 1% relative elongation is taken as unit increase, then the slope is given in daN, a unit of force. This slope measures, at each point of the curve representing the tensile load as a function of the relative elongation, the circumferential tensile rigidity of the ring for a given relative elongation.

The ring of the invention therefore has a increasing circumferential tensile rigidity as a function of the relative elongation between an elongation of zero and the elongation upon rupture. This rigidity may, however, be constant over a certain range of relative elongation and then increase up to the elongation upon rupture.

The rings having a non-linear load-elongation curve used in the invention can be developed in several ways. One such ring may be a ring of package type, that is to say, a ring formed of several reinforcement elements which are parallel to each other or of a single reinforcement element which is wound several times. The reinforcement elements are cables also having a non-linear tension curve as a function of the relative elongation, these cables being extensible up to a given relative elongation and then becoming practically inextensible from said relative elongation up to their own elongation of rupture.

The ring may advantageously be formed of undulated cords undulated continuously or discontinuously over their length, the number of undulations and the amplitude and period of the undulations being such that the cords become linear as from a given relative elongation. The cords can be bare or sheathed with rubber before undulation and may, after undulation, be assembled together in the form of narrow strips or plies by means of a coating between layers of a rubber mix.

The ring having a non-linear load-elongation curve may also be formed by helically winding metal reinforcement cable or wire, with a suitable pitch, around a circumferentially discontinuous core. It may also be formed of an assembly of cables, of package type, a cable being formed of a core of low rupture force around which a metal wire or strand has been helically wound with a suitable pitch, a strand being already an assembly of several unit wires.

This reinforcement ring must preferably withstand the deformations imposed by travel (rolling) since it is located radially close to the ground upon passage into the contact ellipse of the tire with the ground and will accordingly be of a low circumferential flexure rigidity, that is to say a flexure the moment of force of which lies in the plane of the ring. Such a ring is advantageously formed of a core and of textile cords or cables, preferably of aliphatic or aromatic polyamide. Such embodiments of the ring of the invention confer upon the reinforcement a much greater flexibility in flexion than the conventional ring, which definitely improves the life of said reinforcement.

DESCRIPTION OF THE DRAWINGS

The characteristics and advantages of the present invention will be better understood from the following description, read with reference to the drawing which illustrates, several embodiments in non-limitative manner and in which:

FIG. 3A concerns a ring made by winding of the strip formed of undulated wires;

FIG. 3B concerns a ring made by winding of a cable with a brittle core around which inextensible wires are wound.

DESCRIPTION OF PREFERRED EMBODIMENTS

Figure 1:
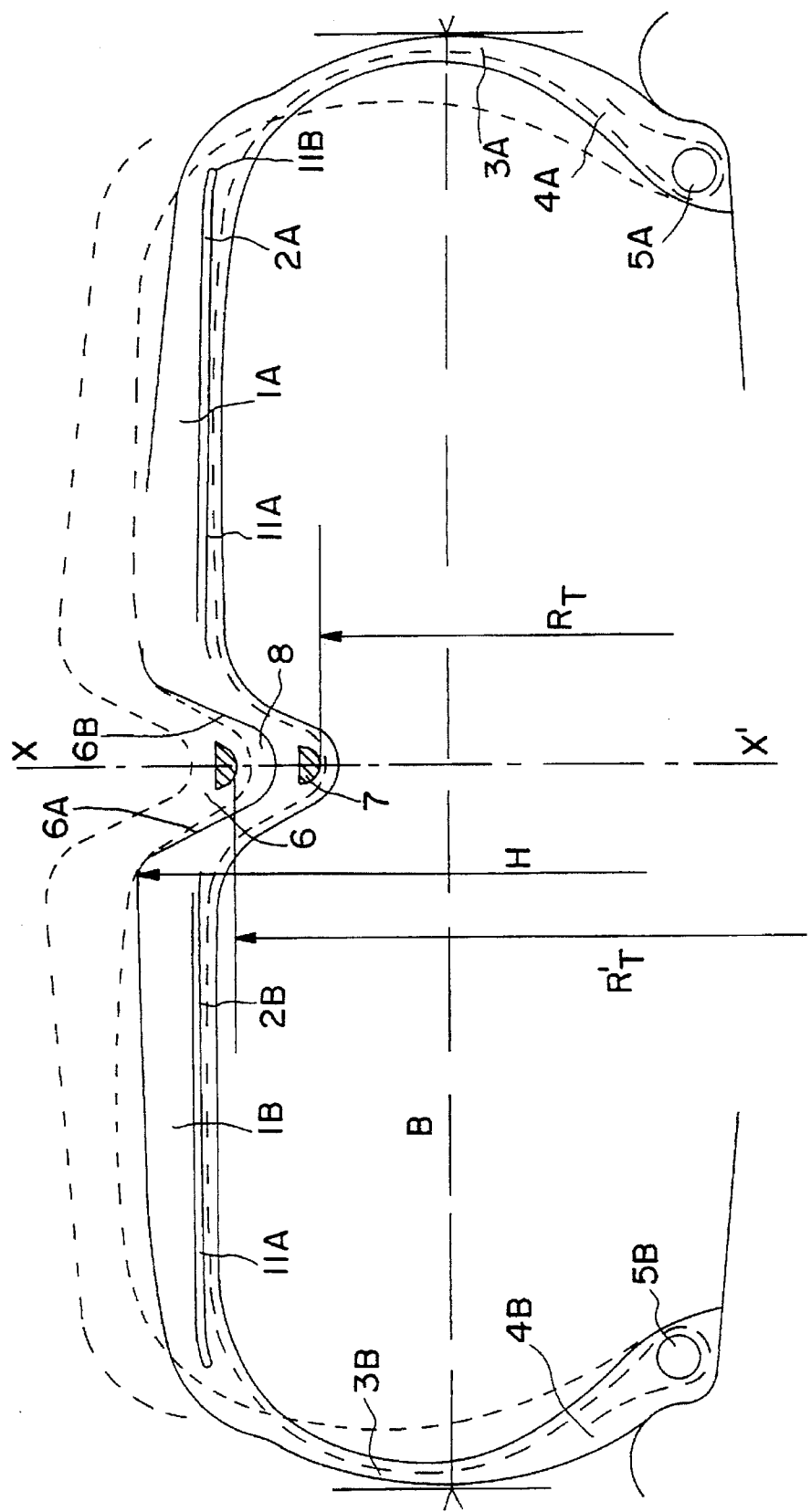
FIG. 1 is a cross section through a tire of size 235-45-17-X in accordance with the invention, on the one hand, before travel (in solid line) and, on the other hand, upon travel with a speed of 2400 rpm (in dashed line)

The tire shown in FIG. 1 has a aspect ratio H/B of 0.45, H being the height on the rim and B being the maximum axial width. It comprises two identical treads (1A) and (1B) reinforced by two identical reinforcements (2A) and (2B).

It furthermore comprises two sidewalls (3A) and (3B) terminating in beads (4A) and (4B) each containing a bead wire of graded type (5A) and (5B), which are practically inextensible. The two treads (1A) and (1B) are connected by a connecting zone (6), formed of two side portions (6A) and (6B) surrounding a groove (8) and the reinforcement ring (7).

The reinforcement ring (7) is formed of an E 18×23 elastic metal cable formed of 18 rings of diameter $^{23}/_{100}$ and covered by a rubber mix. This cable is wound on a suitable winding form to form four layers of 7, 6, 6 and 5 turns respectively.

Figure 2:
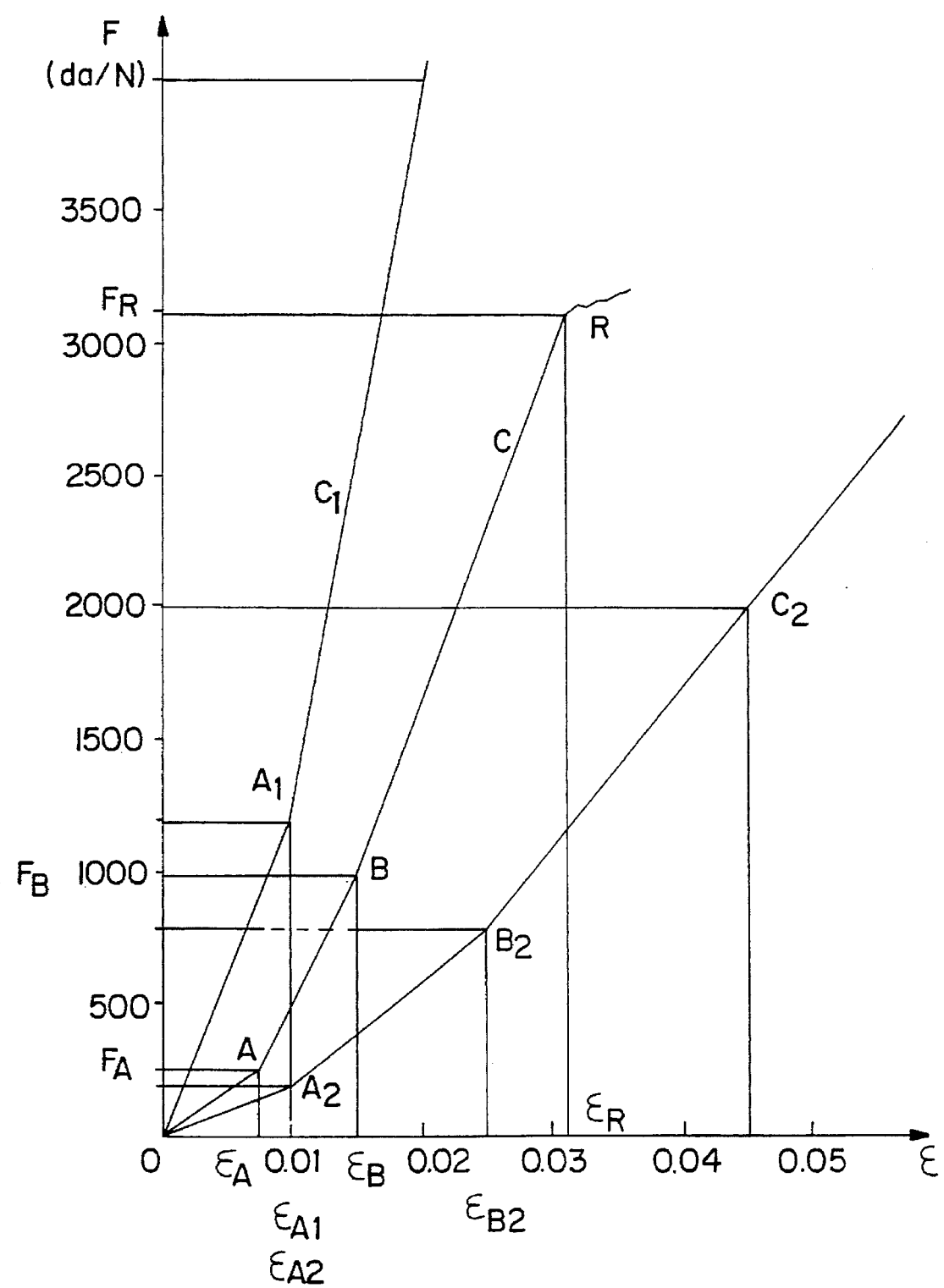
FIG. 2 shows the curve F=f($\epsilon$) which gives the tensile load in daN exerted on the ring used, as a function of the relative elongation, as well as the portion of the plane bounded by the curves C1 and C2.

This ring (7) has a curve C (FIG. 2) of the circumferential tension F as a function of the relative elongation $\epsilon$ such as shown in FIG. 2. This curve can be broken down into three segments OA, AB, BR, the two segments OA and BR being very slightly curved, while the segment AB which connects the two preceding ones together is strongly curved. From the point of origin O of the curve F=f($\epsilon$) to the point A of said curve having the coordinates $\epsilon_A$ equal to 0.0074 and $F_A$ equal to 250 daN, the rigidity to circumferential extension of the ring may be considered to be constant and equal to 33800 daN. The point B of said curve, having the coordinates $\epsilon_B$ being equal to 0.0147 and $F_B$ equal to $10^3$ daN, to the point R corresponding to the rupture of the ring, having the coordinates $\epsilon_R$ equal to 0.0306 and $F_R$ equal to 3125 daN, the circumferential tensile rigidity of the ring is practically constant and equal to 133,600 daN.

The curve C is included within the portion of the plane of the figure which is contained between the two curves C1 and C2. The curve C1 is formed of two segments: a first segment OA1, a second segment extending beyond A1, the point A1 having the abscissa $E_{A1}$ equal to 0.01, and the segment OA1 having a slope of 12×10$^4$ daN, while the segment having A1 as its origin has a slope of 28×10$^4$ daN. The curve C2 is formed, as shown of two segments, OA2, A2B2 and of a third segment extending beyond the point B2. The points A2 and B2 have the abscissas $\epsilon_{A2}$ equal to $\epsilon_{A1}$ and 0.01, and $\epsilon_{B2}$ equal to 0.025 respectively, the slopes of the three segments being 2×10$^4$ daN, 4×10$^4$ daN, and 6×10$^4$ daN respectively.

The cable or cables which form the ring (7) have curves representing the tensile load imposed on a cable as a function of the relative elongation of the cable similar to the curve F, as a function of $\epsilon$, relative to the ring. In particular, from the point of origin O to the point A, an E18×23 cable has an increase in circumferential tensile load equal to 17 daN for an increase in unit relative elongation of 0.01.

In identical manner, from the point B to the point of rupture of said cable, the cable has an increase in circumferential tensile load equal to 51 daN for an increase in unit relative elongation of 0.01.

The extensibility thus selected for the ring (7) makes it possible for the latter to increase its diameter under the effect of the centrifugal force due to the speed of travel, its diameter increasing from a value equal to $2R_T$ to the value $2R'_T$ (FIG. 1), which value is more compatible than the preceding one with the increase in the diameter of the axially outer edges of the crown reinforcements 2A and 2B. It is obvious that the characteristics of extensibility of the reinforcement ring (7) are selected as being the closest to the characteristics which would make it possible to obtain a relative increase in diameter identical to that of the edges of the reinforcements (2A) and (2B). Industrially, this is hardly possible from a financial viewpoint, rings made in small quantities being too expensive. It is also advantageous, after selection of the reinforcement ring (7) which is best suitable as a function of the maximum speed permitted by a tire, to minimize the difference in characteristics by providing for the crown reinforcements (2A) and (2B) turned-up ply edges, which makes it possible to increase the rigidity of the reinforcement edges. If the reinforcement ring (7) is too rigid at the start of deformation, the axially outer edges of the reinforcements (2A) and (2B) will have turned-back plies. On the other hand, if the ring (7) is easily extensible, the axially inner edges of the reinforcements (2A) and (2B) will advantageously have turned-back plies. FIG. 1 shows, in dashed line, the tire in accordance with the invention mounted on its rim, inflated to a pressure of 2.5×10$^5$ Pa and subjected to a speed of rotation of 2400 rpm.

In this tire, the reinforcements (2A) and (2B) are each formed of a ply (11A) which is turned back on itself, the turn-back (11B) being located axially to the outside. It is obvious that the reinforcement formed of a turned-back ply can be replaced by an equivalent reinforcement, such as, for instance, a reinforcement formed of two plies of cords or cables, the free ends of these plies being covered, on one side of said reinforcement, radially by a narrow strip or ply of cables oriented substantially at an angle of 0°, that is to say cables which are substantially parallel to the circumferential direction of the tire.

Figure 3A:
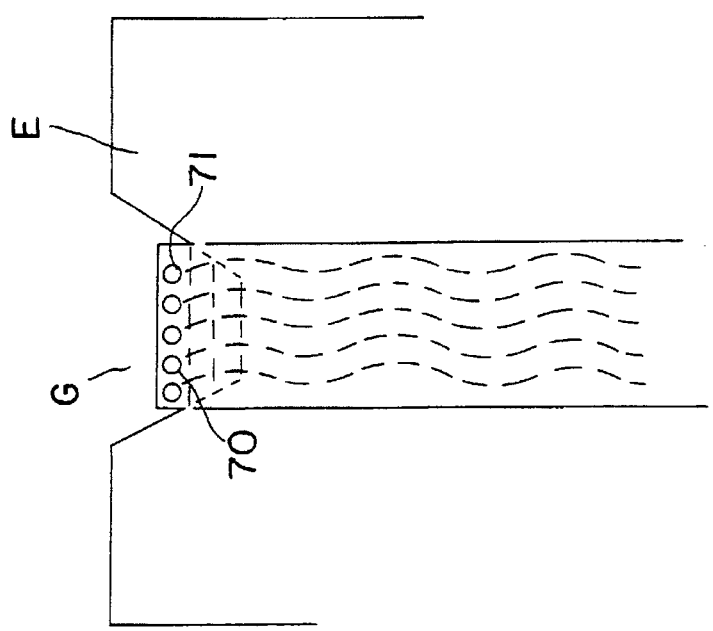
FIGS. 3A and 3B show variants of rings which have curves similar that of FIG. 2.

FIG. 3A shows a ring used in a tire in accordance with the invention. This ring (7), of package type, is obtained by the winding on a winding form E having a winding groove G of a prefabricated strip or ribbon (70) of completely undulated cords (71) (only the center lines are shown), calendered between two strips of rubber mix until there is obtained the number of layers necessary for the forming of the ring (7).

Figure 3B:
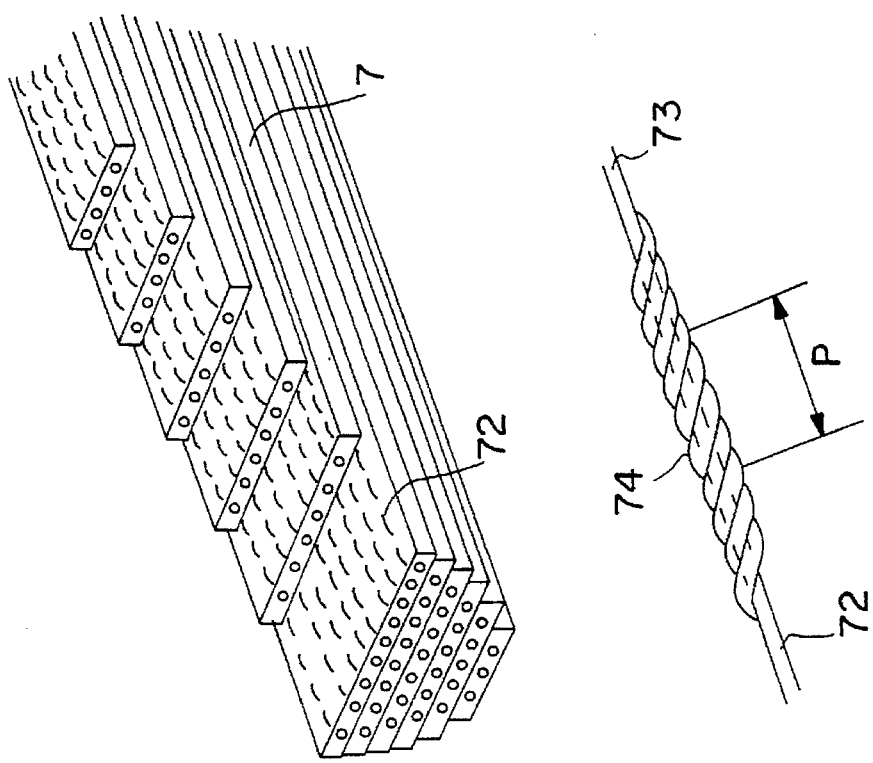

FIG. 3B shows a ring (7) obtained by the winding on a winding form of the same type as that described previously of a linear cable (72) having a brittle core or a core of very low rupture force, said core (73) being covered on the outside by cords (74) wound helically with a winding pitch p.

We claim:

1. A tire having two treads (1A and 1B), spaced axially from each other by a connecting zone comprising a groove (8) and, in its middle, a reinforcement ring (7) of a radius $R_T$ less than that of the treads (1A and 1B), characterized by the fact that the reinforcement ring (7) has a curve C of the circumferential tensile load F in daN as a function of the relative elongation $\epsilon$ which is non-linear, monotonic, increasing, and having at each of its points a tangent the slope of which is positive, being formed of three segments OA, AB, BR, a first segment OA for which the circumferential tensile rigidity is substantially constant and permits easy elongation of the ring, a second segment BR for which the circumferential tensile rigidity is substantially constant and greater than the rigidity relating to the first segment OA, the two segments OA and BR being connected by a strongly curved segment AB, said curve C being included within a region of the plane bordered by two curves C1 and C2, each of these curves being formed of successive linear segments:

the first curve C1 comprising a first segment OA1 extending from the point of origin O to a point A1 of a relative elongation $\epsilon_{A1}$ equal to 0.01 and having a slope of $12 \times 10^4$ daN, followed by a second segment extending beyond the point A1 and having a slope of $28 \times 10^4$ daN, the second curve C2 comprising a first segment extending from the point of origin O to a point A2 of relative elongation equal to 0.01 and having a slope of $2 \times 10^4$ daN, a second segment extending from the point A2 to a point B2 of a relative elongation equal to 0.025 and having a slope of $4 \times 10^4$ daN, this second segment being followed by a third segment extending beyond the point B2 and having a slope of $6 \times 10^4$ daN.

2. A tire according to claim 1, characterized by the fact that the ring (7) is formed of several cables arranged parallel to each other.

3. A tire according to claim 1, characterized by the fact that the ring (7) is formed of layers (70) of undulated cords (71) in the plane of each layer, arranged between two strips of rubber mix.

4. A tire according to claim 1, characterized by the fact that the ring (7) is formed of cables (72), each cable being formed of a core (73) of very low rupture force, covered with helically wound cords (74).

5. A tire according to claim 1 in which the ring is formed of textile cords or cables of aliphatic or aromatic polyamide.

* * * * *